United States Patent [19]

Albrecht

[11] Patent Number: 5,018,769

[45] Date of Patent: * May 28, 1991

[54] ADAPTER FITTING

[76] Inventor: David E. Albrecht, 1383 Granary Rd., Blue Bell, Pa. 19422

[*] Notice: The portion of the term of this patent subsequent to Dec. 26, 2006 has been disclaimed.

[21] Appl. No.: 439,885

[22] Filed: Nov. 20, 1989

[51] Int. Cl.⁵ .............................................. F16L 35/00
[52] U.S. Cl. .................................... 285/39; 285/368
[58] Field of Search ............... 285/39, 412, 368, 258

[56] References Cited

U.S. PATENT DOCUMENTS

| 426,121 | 4/1890 | Gennert | 285/308 X |
| 3,498,643 | 3/1970 | Reiss | 285/308 X |
| 4,712,809 | 12/1987 | Legris | 285/39 X |

Primary Examiner—Dave W. Arola
Assistant Examiner—Heather Chun
Attorney, Agent, or Firm—Frank A. Follmer

[57] ABSTRACT

An adapter fitting made of two parts, a mounting member containing a fluid cavity and a flange member having bolt holes therein, is designed to enable fluid flow components of the type which can be bolted together and provide sealing at mating faces to be used with threaded connections and bolt-on flange connections.

9 Claims, 3 Drawing Sheets

ADAPTER FITTING

BACKGROUND AND SUMMARY OF THE INVENTION

This invention relates to the art of fluid flow piping systems and, more particularly, to adapter fittings for use in such systems.

Fluid flow components of the type which can be bolted together and provide sealing at mating faces offer many advantages over conventional piping and control systems. These advantages include sealing integrity, a minimum number of joints, and compact overall dimensions. Fluid flow components of the indicated type can be used at any outlet that has a bolt-on flange configuration. However, it would be desirable to be able to adapt the fluid flow components of the indicated type for use with many types of outlets, in addition to the bolt-on flange configuration, since this should increase the number of applications that can benefit from the advantages thereof. In particular, it would be desirable to be able to use these fluid flow components with positive sealing type thread connections such as the SAE straight-thread connections.

In high pressure flow applications, it is important that the flow be contained without failures or leakage and the system be assembled easily and efficiently maintained. The hydraulic industry in the United States has promoted the SAE Straight Thread Standard J1926 and the SAE 4-Bolt Split Flange Standard J518 as the ports that best meet these critera. In my copending application Ser. No. 776,497 filed Sept. 16, 1985, now U.S. Pat. No. 4,889,369 it is taught how to effectively adapt a thread to a flange and there is disclosed an adapter fitting which enables fluid flow components of the indicated type to be used with various types of outlets including the positive sealing threaded connections and bolt-on flange connections. The present invention is another form of adapter fitting of the type disclosed in said copending application.

The SAE standard four bolt port is designed for use with a flange construction using four bolts arranged in a generally rectangular bolt pattern and to accommodate a flange system that employs a split flange arrangement as described in said SAE J518 specification. In accordance with my prior invention, it is shown that the adapter fitting can be designed effectively using a four bolt flange geometry as a solid flange.

Most of the flanges in the SAE four bolt split flange systems are rated at relatively high pressures, such as 3,000, 5,000 and 6,000 PSI. However, because of their high acceptance in the industry, many of these flanges are used on components with pressure ratings significantly below the maximum rating of the SAE J518 specification. For example, this port configuration is used on pump suction lines that may see only low positive pressure and/or small amounts of subatmospheric pressure. Also, many components have these ports on tank to reservoir lines with pressures that are normally much lower than the pressure rating of these ports.

In accordance with the present invention there is disclosed an alternate flange construction for use in adapter fittings of the indicated type that can be effectively employed at a reduced pressure rating, such as at pressures up to half or less than the maximum high pressure rating. Briefly stated, the flange system in accordance with the present invention employs only two bolting connections in the flange construction. The design permits a virtually leakproof connection to the four bolt pattern by connecting to either of the diagonal bolt holes in said bolt pattern. Furthermore, the flange design in accordance with the invention facilitates faster assembly as a lower pressure union connector since it only requires the assembly of two bolts. Further, the flange design in accordance with the invention conserves material and labor on new component designs since only two tapped holes are required on the component and these holes are located on the center line with the fluid port. In addition, the design greatly maximizes the flexibility on lower pressure piping while reducing time, material and cost.

DETAILED DESCRIPTION OF THE PREFERRED EMBODIMENTS

Figure 1:
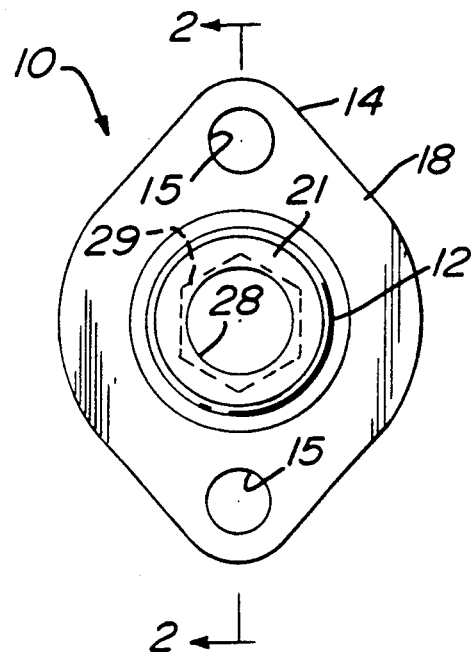
FIG. 1 is a front elevation of an adapter fitting in accordance with the invention.
Figure 2:
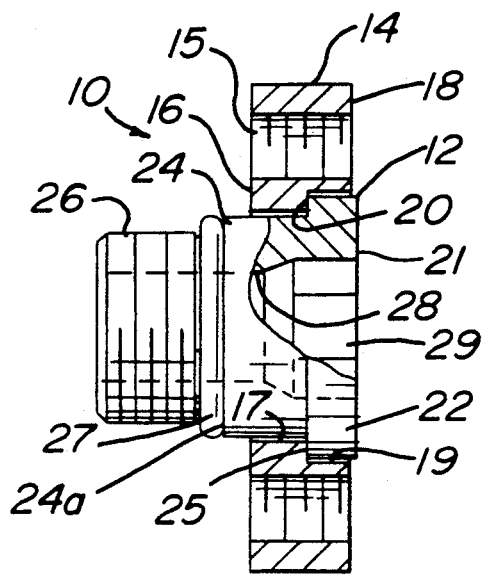
FIG. 2 is a sectional view taken generally on line 2—2 of FIG. 1.

In FIGS. 1 and 2, there is shown an adapter fitting 10 for converting a straight threaded port to a flange port. Adapter fitting 10 comprises two parts, namely, a mounting member 12 and a flange member 14. Flange member, 14 is provided with two threaded bolt holes 15 arranged in a bolt pattern symmetrical with respect to the axis of adapter fitting as is best shown in FIG. 1. Flange member 14 has a cylindrical bore 17 extending between the spaced apart, parallel faces 16 and 18 thereof and centered between bolt holes 15. This central bore comprises a bore portion 17 extending inwardly from face 16 and a bore portion 19 extending inwardly from face 18. Bore portion 19 has a larger diameter than bore portion 17 whereby they meet at an annular shoulder 20. Mounting member 12 has a cylindrical shape and is positioned in the central bore portions 17 and 19 in the center of the bolt holes 15 of flange member 14 and is adapted to be fastened to the threaded connection of a compatible threaded port such as a fluid flow component that terminates at a straight threaded outlet port. Mounting member 12 has an enlarged diameter portion 22 received in the large bore portion 19 of flange member 14, a reduced diameter portion 24 received in the smaller bore portion 17 of flange member 14, and an annular shoulder 25 as is shown in FIG. 2. By this construction, annular shoulder 25 of mounting member 12 is arranged to mate with the annular shoulder 20 of flange member 14 so as to limit relative movement therebetween in one direction for holding the parts in the position as shown in FIG. 2. The reduced diameter portion 24 of mounting member 12 extends beyond or outwardly from the face 16 of flange member 14 and terminates at an externally threaded end portion 26. An O-ring seal 27 extends around the circumference of the threaded end portion 26 at the inward end thereof, as shown in FIG. 2, to provide sealing contact with the internal wall portion of the threaded outlet port to which this portion is to be engaged, such as a standard (SAE) straight thread port. A radially extending annular wall 24a is formed on mounting member portion 24 adjacent O-ring seal 27. When adapter fitting 10 is connected to a positive seal straight thread, such as the standard SAE straight thread port, and others, wall 24a provides a shoulder which is used as a positive stop for the thread, which permits prestressing of the thread, and which allows the shoulder surface to be held under compression to maintain a positive retaining surface between the shoulder surface and the mating component. This permits sealing ring 27 to be extremely effective as a positive seal.

Mounting member 12 is provided with a central axially extending bore 28 providing a fluid flow passage which extends completely through the mounting member 12 from the threaded end 26 to the annular face 21 thereof which extends slightly beyond the face 18 of flange member 14 in the mating positions thereof as is apparent from a consideration of FIG. 2. It is important that face 21 extend slightly beyond face 18 so as not to interfere with the sealing means that cooperate with face 21.

Mounting member 12 is provided with a wrenching surface 29 to aid in fastening the mounting member 12 to the threaded outlet. As shown in FIGS. 1 and 2, wrenching surface 29 comprises an internally broached hexagonal configuration. However, it will be apparent that other types of wrenching surfaces may be employed, such as spanner holes or the like. By providing the wrenching surface 29 internally of the mounting member 12 and extending it inwardly from the face 21 thereof, the design allows for a mounting that is of a minimum length.

It will be noted that the face of the component bolted to the flange member 14 of adapter fitting 10 will have a seal extending around the fluid passage bore 28. This sealing is accomplished as the seal meets the face 21 of the mounting member 12 in an area extending around the opening of fluid passage bore 28 therein. It will be noted that the flange member 14 participates in the fastening of adapter fitting 10 to the fluid components, but is not involved in any sealing action, the fluid passage bore 28 being entirely enclosed within the mounting member 12.

Figure 3:
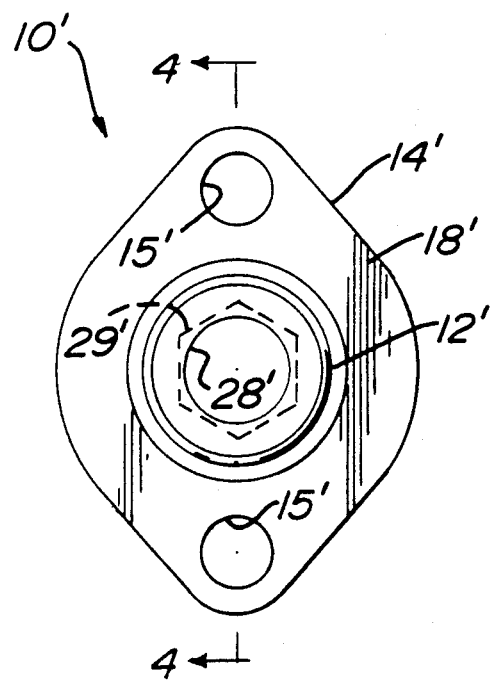
FIG. 3 is a front elevational view of another adapter fitting in accordance with the invention.
Figure 4:
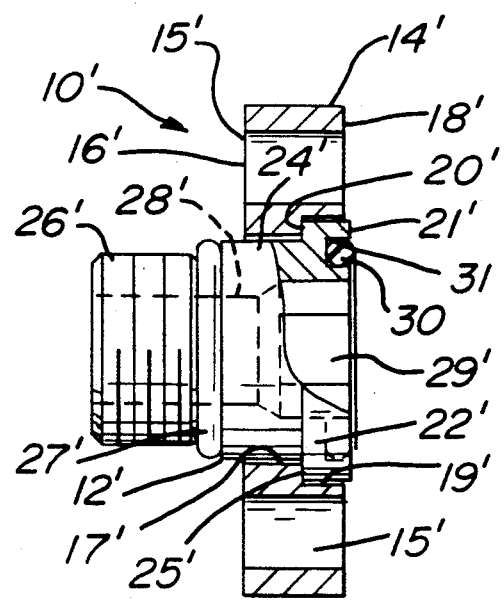
FIG. 4 is a sectional view taken generally on line 4—4 of FIG. 3.

In FIGS. 3 and 4 there is shown an adapter fitting 10' for converting a straight threaded port to a flange of a construction corresponding to the flange provided by adapter fitting 10. Adapter fitting 10' is essentially the same as adapter fitting 10 except that there is provided a face-mounted seal on the mounting member and the flange member is provided with through (non-threaded) bolt holes. Further, as seen by a comparison of FIGS. 1 and 2 and FIGS. 3 and 4 adapter fitting 10' is comprised of parts having similar construction and dimension as corresponding parts of adapter fitting 10. Thus, corresponding parts of adapter fitting 10' have been provided with the same reference numerals as those of adapter fitting 10 with primes added.

Adapter fitting 10' is comprised of two parts, namely, a mounting member 12' and a flange member 14'. Flange member 14' is identical in construction with flange member 14 except that the two bolt holes 15' thereof, which are arranged in the identical configuration as bolt holes 15, are through (non-threaded) bolt holes. Thus, flange member 14' has a cylindrical bore comprised of bore portions 17' and 19' extending between faces 16' and 18' and meeting at an annular shoulder 20'. Mounting member 12' is cylindrical and is positioned in the central bore portions 17' and 19' in the center of the bolt pattern of flange member 14' and is adapted to be fastened to the threaded connection of a compatible threaded port, such as a fluid flow component that terminates at a straight threaded outlet port. Mounting member 12' has portions 22' and 24' which form an annular shoulder 25' arranged to mate with the annular shoulder 20' of flange member 14'. Portion 24' of mounting member 12' extends beyond face 16' of flange member 14' and terminates at an externally threaded end portion 26'. An O-ring seal 27' is provided to provide a sealing contact with the internal wall portion of a threaded outlet port to which end portion 26' is engaged. The parts are configured so that adapter fitting 10' can be connected to a positive seal straight thread, such as the standard SAE straight threaded port as described above with respect to FIGS. 1 and 2.

Mounting member 12' is provided with a central axially extending bore 28' providing a fluid flow passage through adapter fitting 10'. Mounting member 12' is provided with a wrenching surface 29' formed of an internally broached hexagonal configuration, and arranged to extend inwardly from face 21' so as to provide a mounting that is of a minimum length.

An O-ring sealing member 30 is mounted in an annular recess 31 in the face 21' of mounting member 12' and is constructed to project slightly from this face so as to provide good sealing contact with a fluid flow component mounted in face-to-face contact adjacent thereto. The wrenching portion 29' is located within the annular recess 31 as is apparent from FIG. 3.

Figure 5:
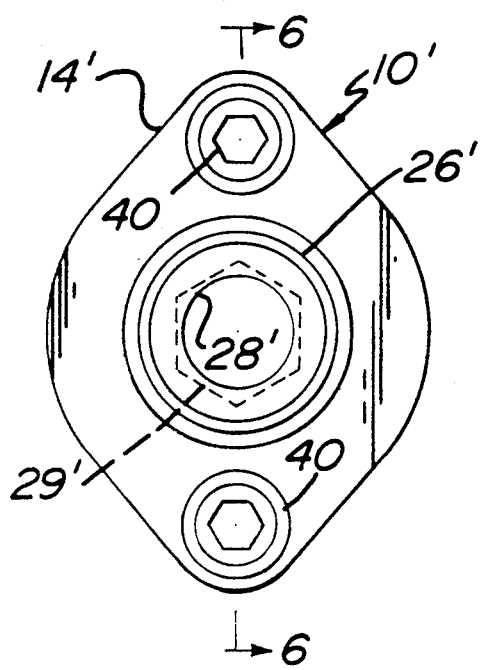
FIG. 5 is a front elevational view of a union comprising two adapter fittings in accordance with the invention.
Figure 6:
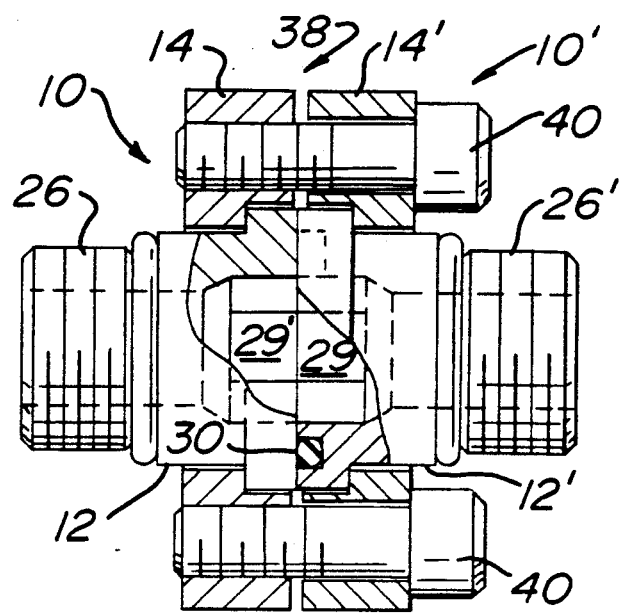
FIG. 6 is a sectional view taken generally on line 6—6 of FIG. 5.

In FIGS. 5 and 6 there is shown a preferred union flange connection wherein adapter fittings 10 and 10' are mounted together with their faces mating. This connection 38 ensures a virtually leakproof connection while affording easy component removal from a fluid flow system. Adapter fittings 10 and 10' are secured together in mating relationship by bolts 40 which are arranged to pass through the non-threaded holes 15' of adapter fitting 10' and to engage the threaded holes 15 of adapter fitting 10 so as to draw and hold the two flange members 14 and 14' together. Sealing between the two opposing faces 21 and 21' is accomplished with the seal 30 provided in the face 21' of adapter fitting 10'. It will be apparent that the adapter fittings 10 and 10' may be connected to flow components having threaded ports by means of their threaded portions 26 and 26', respectively.

Two of the families of two bolt flange systems of this invention have their bolt centers calculated from the formula $$A = \sqrt{C^2 + E^2}$$

wherein A is the spacing between bolt centers, C is the spacing between the two horizontally spaced bolts of a comparable SAE 4-bolt pattern, and E is the spacing between the vertically spaced bolts of a comparable SAE 4-bolt pattern.

By using the bolt spacings calculated from this formula, a two bolt flange can be made that will connect to either of the two diagonal bolts in the comparable 4-bolt pattern. It should be noted that this calculation results in a bolt spacing that is only a small percentage over the larger bolt spacing of the rectangular pattern and, therefore, allows for a cost effective section modulus for this two bolt flange. Moreover, the thinner flange and the corresponding shorter body of the design allows for an even more compact assembly. By limiting the bolt stress to the same value as permitted in the J518 specification, these two families of bolt flanges of this invention can be safely rated for up to half of the maximum pressure rating of the SAE four bolt pattern using similar materials at the same stress levels.

The following tabulation shows the most popular sizes of 08 thru 32 (in sixteenths of an inch) with their maximum pressure ratings for two families of two bolt solid flanges of this invention.

TWO BOLT SOLID FLANGES FOR ATTACHING TO SAE FOUR BOLT SPLIT FLANGE PORTS
(Maximum Pressure Rating PSI)

| SIZE | CODE 61 PORT | CODE 62 PORT |
| --- | --- | --- |
| 12 | 2500 | 3000 |
| 16 | 2500 | 3000 |
| 20 | 2000 | 3000 |
| 24 | 1500 | 3000 |
| 32 | 1500 | 3000 |

This tabulation demonstrates how this invention can be applied to the SAE Four Bolt Split Flange Port for a high percentage of today's pressure requirements. Naturally this invention can be adapted to numerous port patterns and can be designed for numerous pressure ratings.

Figure 7:
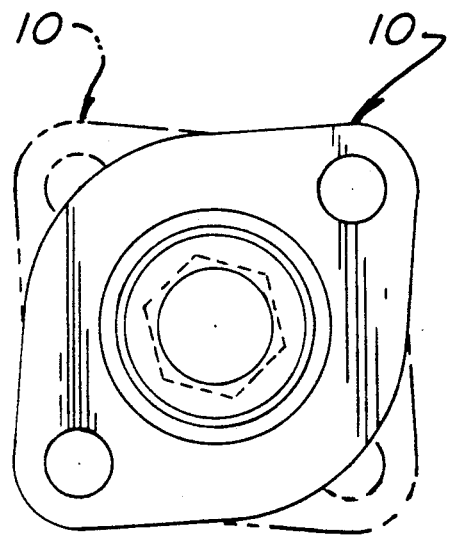
FIG. 7 is a view illustrating the two positions in which a flange of the invention can be attached to a port having a four bolt pattern.

It is conceiveable that the two bolt flange system may be subjected to external mechanical loads. Resistance to such a load is maximized by spacing the bolts farther away from the flange center along the axis of the load. For this reason, a force applied parallel to an axis passing through the bolt centerlines is more effectively counteracted than a force applied perpendicular to this axis. Using this knowledge, the piping designer can determine the external loading anticipated and specify the angular relationship of the bolt pattern to optimize the bolt spacing in each plane and thereby minimize the bolt stress levels caused by external forces. FIG. 7 shows the flange rotated 45 degrees to the right of vertical which will give equal bolt spacing in both the vertical and the horizontal planes to accommodate equal loading in either of these planes. Also drawn in phantom lines in FIG. 7 is the flange rotated 45 degrees to the left which has the same effect.

Figure 8:
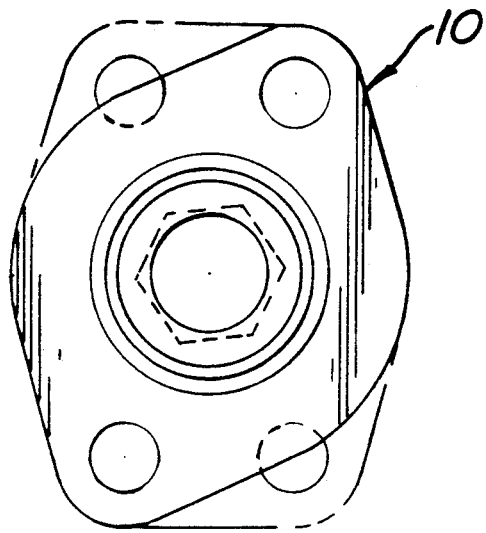
FIGS. 8 and 9 show a flange of the invention positioned to the alternate diagonal bolt patterns of an SAE four bolt flange port with the longer bolt spacing in the vertical direction.
Figure 9:
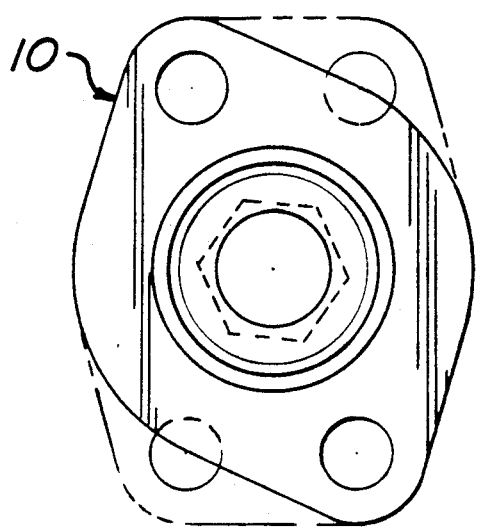
Figure 10:
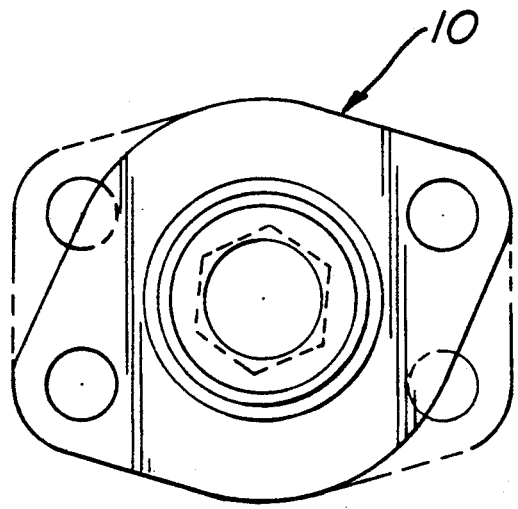
FIGS. 10 and 11 show a flange of the invention positioned to the alternate diagonal bolt patterns of an SAE four bolt flange port with the longer bolt spacing in the horizontal direction.
Figure 11:
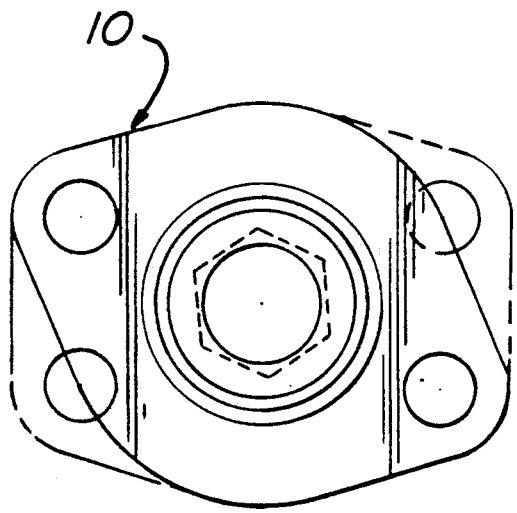

FIGS. 8 and 9 show the flange of this invention positioned to the alternate diagonal bolt patterns of the SAE Four Bolt Split Flange Port. These rectangular bolt patterns have the longer bolt spacing in the vertical plane and therefore the maximum external load that this flange connection can accommodate is in the vertical plane. Conversely FIGS. 10 and 11 show the flange of this invention positioned in the two diagonal bolt holes of the SAE Flange ports where the maximum rectangular bolt spacing is in the horizontal plane resulting in this flange connection having its maximum capacity for external load in the horizontal plane.

What is claimed is:

1. An adapter fitting for connecting a threaded flow connector and a face sealing flange flow connector comprising:
   a flange member having only two bolt holes arranged in a spaced apart pattern and a bore located centrally within said bolt hole pattern and extending through said flange member, said bolt holes being centered on an axis extending through the center of said bore,
   and a mounting member mounted in said bore of said flange member and including:
   a first body portion adapted to be held in arresting contact with said flange member and providing a face for mating with a flanged flow connection,
   a second body portion extending beyond said flange member to a location spaced therefrom, the extended end of said second body portion having threads formed thereon for engagement with the threaded terminal port of one of said flow components,
   a fluid flow passage extending through said body portions, and
   a wrenching surface formed internally of said first body portion of said mounting member and adapted to be engaged by a wrenching mechanism for causing rotation of said mounting member.

2. An assembly according to claim 1 wherein said wrenching surface is located to extend inwardly from said mating face of said first body portion of said mounting member.

3. An adapter fitting according to claim 2 wherein said wrenching surface is formed by a multi-sided hole extending inwardly from said one end of said fluid flow passage.

4. An adapter fitting according to claim 2 including means for providing sealing contact between said mating face of said first body portion of said mounting member and a flanged flow connection connected adjacent thereto, said sealing means including a sealing member mounted on said mating face and extending around one end of said fluid flow passage.

5. An adapter fitting according to claim 1 wherein said two bolt holes are spaced apart an amount so as to be aligned with either pair of the two diagonally spaced bolt holes of a comparable SAE Four Bolt Standard port.

6. An adapter fitting according to claim 5 wherein said two bolt holes are spaced apart an amount A determined by the formula $$A = \sqrt{C^2 + E^2},$$

wherein C is the spacing between two horizontally space bolts of a comparable SAE 4-bolt pattern and E is the spacing between two vertically spaced bolts of said comparable SAE 4-bolt pattern.

7. An assembly of adapters for interconnecting two fluid flow components each of which has a threaded terminal port comprising:
   a first adapter for adapting a threaded port to a flange port, said first adapter including:
   a flange member having only a pair of spaced apart bolt holes arranged in a pattern and a bore located centrally within said bolt hole pattern and extending through said flange member, and a mounting member mounted in said bore of said flange member and including:

a first body portion adapted to be held in movement limiting contact with said flange member and providing a face for mating with a flanged flow connection, a second body portion extending beyond said flange member to a location spaced therefrom, the extended end of said second body portion having threads formed thereon for engagement with the threaded terminal port of one of said flow components, a fluid flow passage extending through said body portions, and a wrenching surface formed internally of said first body portion of said mounting member and adapted to be engaged by a wrenching mechanism for causing rotation of said mounting member, and a second adapter for converting a threaded port to a flange corresponding to said flange port of said first adapter and including;

a flange member having only two spaced apart bolt holes arranged in a pattern corresponding to said bolt hole pattern of said first adapter and a bore located centrally within said bore hole pattern and extending through said flange member, and a mounting member mounted in said bore of said flange member and including:

a first body portion adapted to be held in movement limiting contact with said flange member and providing a face for mating with said mating face of said mounting member of said first adapter, a second body portion extending beyond said flange member to a location spaced therefrom, the extended end of said second body portion having threads formed thereon for engagement with the threaded terminal port of the other of said flow components, a fluid flow passage extending through said body portions, means for providing sealing contact between said mating face of said mounting member of said second adapter and said mating face of said mounting member of said first adapter, said sealing means including a sealing member mounted on said second adapter mating face and extending around said fluid flow passage of said second adapter, and a wrenching surface formed internally of said first body portion of said second adapter mounting member and adapted to be engaged by wrenching mechanism for causing rotation thereof, and bolt means cooperable with said bolt holes of said flange members for securing said first body portions of said mounting members of said first and second adapters together in mating face-to-face contact with said fluid flow passages thereof in flow communication, said sealing contact between the mating faces of said mounting members of said first and second adapters.

8. An assembly according to claim 7 wherein said wrenching surfaces of said adapters are located to extend inwardly from said mating faces of said first body portions of said mounting members thereof.

9. An assembly according to claim 8 wherein said wrenching surfaces are formed by a multi-sided hole.

* * * * *